United States Patent Office 3,024,100
Patented Mar. 6, 1962

3,024,100
CORROSION-INHIBITED LIQUID FERTILIZER COMPOSITIONS
Robert Parks Langguth and Eli Seifter, Dayton, Ohio, assignors to Monsanto Chemical Company, St. Louis, Mo., a corporation of Delaware
No Drawing. Filed May 20, 1957, Ser. No. 660,039
7 Claims. (Cl. 71—34)

This invention relates to improved liquid fertilizer compositions which are characterized by a material reduction in the corrosion of storage containers and application equipment. More specifically this invention relates to corrosion-inhibited liquid fertilizer compositions which are suitable for use with aluminum equipment.

An early source of nitrogen in agricultural application was the use of ammonium nitrate solutions. The ammonium nitrate solutions were generally held in aluminum storage tanks and dispensed in the field with aluminum equipment. Accordingly, the industry has a considerable present investment in aluminum storage vessels and application equipment. In recent years there has been a growing demand for liquid fertilizers generally, i.e. fertilizer compositions which also contain $P_2O_5$ with or without $K_2O$ to provide a complete liquid formulation. However it was found that the presence of liquid fertilizer compositions containing $P_2O_5$ caused excessive corrosion to the aluminum equipment which was then in wide use. It was subsequently found that the presence of from about 200 up to about 500 p.p.m. of fluorine as a fluosilicate, e.g. sodium fluosilicate, potassium fluosilicate and ammonium fluosilicate, effected a material reduction in the corrosion rate of neutral liquid fertilizer compositions containing $P_2O_5$. However it was subsequently found that the fluosilicate-modified liquid fertilizer composition was not a complete solution to the problem as the formulation caused pitting of the aluminum.

It is the principal object of this invention to provide a substantially neutral liquid fertilizer composition containing $P_2O_5$ which can be stored and dispensed with aluminum equipment. Another object of this invention is to provide a substantially neutral liquid fertilizer composition containing $P_2O_5$ which is characterized by a low rate of corrosion and is substantially free from causing pitting when employed with aluminum equipment. Other objects will be apparent from the following disclosure.

It has now been found that the combination of from about 200 up to about 500 p.p.m. of fluorine as a soluble fluosilicate and from about 20 to about 200 p.p.m. of a soluble molybdate when present in substantially neutral liquid fertilizer compositions containing the phosphate nutrient, i.e. the orthophosphate ion, provides a liquid fertilizer composition which can be employed in aluminum equipment.

The preferred suitable fluosilicates are sodium fluosilicate, ammonium fluosilicate, and potassium fluosilicate. The preferred suitable molybdates are ammonium molybdate, potassium molybdate and sodium molybdate. The ratio of the fluorine from the fluosilicate to the molybdate compound can vary from about 2.5 to 1 to about 10 to 1 with the ratio of about 5 to 1 being generally preferred. It was found that ratios of less than about 2.5 to 1 tended to give a yellow phosphomolybdate color to the fertilizer solution with the subsequent possibility of eventual precipitation of the complex. On the other hand ratios greater than about 10 to 1 generally do not provide the necessary inhibition of pitting of the aluminum equipment.

The substantially neutral liquid fertilizer compositions are generally formulated by various mixtures of monoammonium phosphate, diammonium phosphate, ammonium nitrate, ammonium sulfate, urea, potassium chloride, potassium nitrate, monopotassium phosphate, dipotassium phosphate, and the like, or by the use of anhydrous ammonia, aqua ammonia, phosphoric acid, potassium hydroxide, and the like to directly produce a substantially neutral salt solution. Thus the neutral liquid fertilizer solutions can be a solution of ammonium phosphate or ammonium phosphate to which has been added ammonium nitrate, urea, potassium chloride, and the like to form a variety of N—P or N—P—K liquid fertilizers. The pH of a 1-10 dilution of the liquid fertilizer composition preferably ranges from about 6 to about 8.

As is well known, fertilizer compositions are conventionally labeled in terms of the principal nutrient components therein, i.e. nitrogen, phosphorus, and potassium, wherein phosphorus and potassium are given in terms of $P_2O_5$ and $K_2O$, respectively, and the N—P—K designation hereinabove and hereinafter employed will be understood in these terms.

Various illustrative neutral liquid fertilizer compositions are shown in the following table wherein the various components are indicated in parts by weight.

| | N—P—K | Ammonia | Ammonium nitrate | Ammonium sulfate | Urea | Phosphoric acid (75%) | Monoammonium phosphate | Diammonium phosphate | Potassium chloride | Potassium nitrate | Water |
|---|---|---|---|---|---|---|---|---|---|---|---|
| 1 | 8-24- 0 | | | | | | 10.7 | 32.8 | | | 56.5 |
| 2 | 8-24- 0 | 9.8 | | | | 44.5 | | | | | 45.7 |
| 3 | 12-20- 0 | | | | 11.5 | | 8.9 | 27.4 | | | 52.2 |
| 4 | 8-20- 0 | | | 6.0 | | | 8.9 | 27.4 | | | 57.7 |
| 5 | 11-22- 0 | | | | 7.8 | | 9.8 | 30.1 | | | 52.3 |
| 6 | 13-13- 0 | | 24.9 | | | | 5.8 | 17.8 | | | 51.6 |
| 7 | 7-21- 5 | | | | | | 9.4 | 28.7 | 8.1 | | 53.8 |
| 8 | 6-20- 6 | 7.4 | | | | 37.1 | | | 9.8 | | 45.2 |
| 9 | 5-20-10 | 6.2 | | | | 37.1 | | | 16.8 | | 40.0 |
| 10 | 10-15- 5 | 6.1 | 5.2 | | 4.0 | 27.8 | | | | | 46.0 |
| 11 | 10-15- 5 | 6.1 | 7.3 | | 5.6 | 27.8 | | | | 11.0 | 45.1 |
| 12 | 5-15- 5 | 6.2 | | | | 27.8 | | | 8.1 | | 57.9 |
| 13 | 10-10-10 | 3.5 | | | 15.8 | 18.5 | | | 8.1 | | 45.9 |
| 14 | 5-10-10 | | 2.4 | | 2.0 | | | | 16.3 | | 61.3 |
| 15 | 10-10- 5 | 3.5 | | | 15.8 | 18.5 | 4.5 | 13.7 | 16.2 | | 54.0 |
| 16 | 5-10- 5 | | | 7.8 | | | 4.5 | 13.7 | 8.1 | | 66.0 |
| 17 | 12- 6- 6 | | 14.0 | | 11.2 | | 2.7 | 8.2 | 9.7 | | 54.2 |

The pH of the above formulations as a 1 to 10 dilution with water will vary between about 6 to about 8 and most will vary between about 6.5 to about 7.5.

The subject liquid fertilizer compositions can also contain minor amounts of surfactants to facilitate the assimilation of the nutrient composition by the plant, minor amounts of soluble compounds containing essential trace elements in available form, and the like. The desired liquid fertilizer composition can be formulated batchwise or by a continuous process as will be readily understood by those skilled in the art.

The following examples are illustrative of the instant invention.

Example 1

Since the high phosphate content liquid fertilizer composition was found to cause the most severe corrosion rate of the various formulations, the 8-24-0 composition was selected such that the following evaluation results would generally exemplify the most drastic corrosive effects which might be met in the field.

A liquid fertilizer composition (8-24-0) was prepared by dissolving 107 parts by weight of monoammonium phosphate and 328.1 parts by weight of diammonium phosphate in 564.9 parts by weight of water. Similar compositions were prepared which contained 500 p.p.m. of fluorine as sodium fluosilicate and 500 p.p.m. of fluorine as sodium fluosilicate in combination with 100 p.p.m. of ammonium molybdate. It was found that the corrosion rate for the uninhibited liquid fertilizer composition on 3SO aluminum at 140° F. was 1050 m.p.y. Under similar conditions it was found that the presence of 500 p.p.m. of fluorine as sodium fluosilicate in the liquid fertilizer composition reduced the corrosion rate to 25 m.p.y., but caused pitting. The addition of 100 p.p.m. of ammonium molybdate to the latter liquid fertilizer composition was found to reduce the corrosion rate to 31 m.p.y. and the aluminum was free from pitting. It was further found that the corrosion rate was generally reduced to less than about 10 m.p.y. for the corrosion-inhibited composition when the system was not subjected to temperatures greater than about 100° F.

Example 2

In order to determine whether the presence of the combined corrosion inhibitors was deleterious to the germination of seed, qualitative tests were run in greenhouse flats. Radish, cucumber, tomato, and rye grass seeds were selected for this evaluation as these plants do not have particularly hardy seedlings. Quadruplicate greenhouse flats containing the aforesaid seeds were prepared and two sets of flats were fertilized with the uninhibited liquid fertilizer composition of Example 1 and the other two sets of flats were fertilized with the liquid fertilizer composition of Example 1 which contained the combined corrosion inhibitor composition of 500 p.p.m. of fluorine as sodium fluosilicate and 100 p.p.m. of ammonium molybdate. The liquid fertilizer compositions were applied at the rate of 400 pounds per acre and 1000 pounds per acre to the duplicate flats. The former rate of application is typical of actual field practice while the latter rate of application would be higher than would be used in fertilizer practice, but was employed to ascertain whether there was any observable deleterious effects to the seeds at substantially higher than normal application rates. It was found that the inhibited fertilizer composition produced no phytotoxic effect on the germination or growth of the test plants.

Example 3

To demonstrate whether there was any observable quantitative effect of the combined inhibitors on the growth of plants triplicate greenhouse flats were seeded with perennial rye grass at the rate of 400 pounds of seed per acre. This high rate of planting was selected to obtain large amounts of plant growth and to make such growth more dependent on the added nutrients. The uninhibited and inhibited liquid fertilizer compositions of Example 2 were applied to separate experimental flats at planting time at the optimum rate of 400 pounds per acre and the third control flat was not fertilized. The experimental plots were cut 21 days after planting and fertilizing to determine the yield of grass obtained by the various treatments. After these cuttings were made, the plots were again fertilized at the rate of 400 pounds per acre of liquid fertilizer and yields again determined after a growth period of 12 days. After this cutting, the flats were again fertilized at the same rate and the yields obtained after an additional 13-day growth period. The following table summarizes the data obtained in this evaluation study.

| Time in days | Parts by weight of grass | | |
| --- | --- | --- | --- |
|  | Control | 8-24-0 | Inhibited 8-24-0 |
| 21 | 13 | 27.6 | 29.4 |
| 12 | 15 | 81.0 | 81.0 |
| 13 | 23.5 | 70.5 | 86.5 |
| 46 [1] | [1] 51.5 | [1] 179.1 | [1] 196.9 |

[1] Total.

These evaluation results clearly demonstrate that the combined inhibitors do not exhibit any phytotoxic effect on plant growth.

We claim:

1. A corrosion inhibited aqueous composition useful in the protection of aluminum storage and handling equipment from corrosion by orthophosphate ions, which composition has a pH between about 6 and about 8 and contains an inorganic orthophosphate salt selected from the group consisting of monoammonium orthophosphate diammonium orthophosphate, monopotassium orthophosphate, and dipotassium orthophosphate, and from about 200 to about 500 p.p.m. of fluorine as a soluble fluosilicate compound selected from the group consisting of sodium fluosilicate, potassium fluosilicate, and ammonium fluosilicate and an amount of a soluble molybdate compound selected from the group consisting of sodium molybdate, potassium molybdate, and ammonium molybdate, such that the weight ratio of said fluorine to said soluble molybdate compound is between about 2.5:1 and about 10:1.

2. A corrosion inhibiting composition according to claim 1 containing about 500 p.p.m. of fluorine as sodium fluosilicate and about 100 p.p.m. of ammonium molybdate.

3. A corrosion inhibited aqueous composition useful in protecting aluminum equipment from corrosion by orthophosphate ions, which composition has a pH between about 6 and about 8 and contains a mixture of an ammonium orthophosphate and at least one of the compounds selected from the group consisting of ammonium nitrate, ammonium sulfate, urea, potassium chloride, monopotassium phosphate, dipotassium phosphate and potassium nitrate, and also contains from about 200 p.p.m. to about 500 p.p.m. of fluorine as a soluble fluosilicate compound selected from the group consisting of sodium fluosilicate, potassium fluosilicate, and ammonium fluosilicate, and an amount of a soluble molybdate compound selected from the group consisting of sodium molybdate, potassium molybdate, and ammonium molybdate such that the weight ratio of said fluorine to said soluble molybdate compound in said composition is between about 2.5:1 and about 10:1.

4. A corrosion inhibiting composition according to claim 3 which contains about 500 p.p.m. of fluorine as sodium fluosilicate and about 100 p.p.m. of ammonium molybdate.

5. A corrosion inhibited aqueous composition useful in protecting aluminum equipment from corrosion by orthophosphate ions, which composition has a pH between about 6 and about 8 and comprises an ammonium orthophosphate, from about 200 to about 500 p.p.m. of fluorine as a soluble fluosilicate compound selected from the group consisting of sodium fluosilicate, potassium fluosilicate, and ammonium fluosilicate, and an amount of a soluble molybdate compound selected from the group consisting of sodium molybdate, potassium molybdate, and ammonium molybdate such that the weight ratio of said fluorine to said soluble molybdate compound is between about 2.5:1 and about 10:1.

6. A method of inhibiting the corrosion of aluminum equipment by an aqueous, liquid fertilizer composition having a pH between about 6 and about 8 and containing an inorganic orthophosphate salt selected from the group consisting of monoammonium orthophosphate, diammonium orthophosphate, monopotassium orthophosphate, and dispotassium orthophosphate, said method comprising the incorporation in said composition of from about 200 to about 500 p.p.m. of fluorine as a soluble fluosilicate compound selected from the group consisting of sodium fluosilicate, potassium fluosilicate, and ammonium fluosilicate, and an amount of a soluble molybdate compound selected from the group consisting of sodium molybdate, potassium molybdate and ammonium molybdate such that the ratio of said fluorine to said soluble molybdate compound in said composition is between about 2.5:1 and about 10:1.

7. A method according to claim 6 wherein about 500 p.p.m. of fluorine as sodium fluosilicate and about 100 p.p.m. of ammonium molybdate are employed.

References Cited in the file of this patent

UNITED STATES PATENTS

| | | |
|---|---|---|
| 2,147,395 | Bayes | Feb. 14, 1939 |
| 2,238,651 | Keenen | Apr. 15, 1941 |
| 2,586,709 | Phillips | Feb. 19, 1952 |
| 2,719,781 | Hesch | Oct. 4, 1955 |
| 2,739,886 | Facer | Mar. 27, 1956 |
| 2,770,538 | Vierling | Nov. 13, 1956 |
| 2,778,712 | Caldwell | Jan. 22, 1957 |
| 2,755,170 | Stubblefield | July 17, 1957 |

FOREIGN PATENTS

| | | |
|---|---|---|
| 736,215 | Great Britain | Sept. 7, 1955 |